April 11, 1944.　　G. A. ORMEROD ET AL　　2,346,229

GAS METER

Filed Sept. 17, 1942

Inventors
George A. Ormerod
and Alfred Smith
by Mawhinney & Mawhinney
Attorneys.

Patented Apr. 11, 1944

2,346,229

UNITED STATES PATENT OFFICE 2,346,229

GAS METER

George Arnold Ormerod and Alfred Smith, Liverpool, England, assignors of one-third to J. H. Robinson & Company (Liverpool) Limited, Liverpool, England Application September 17, 1942, Serial No. 458,674
In Great Britain November 27, 1941

4 Claims. (Cl. 73—268)

This invention relates to a gas meter of the kind having a partition dividing the main portion of the meter casing into two chambers. In each of these chambers there is a bellows device or diaphragm (dividing each chamber into two measuring chambers) which moves to-and-fro (as gas alternately enters the measuring chambers on opposite sides of the diaphragm) and thereby oscillates a spindle carrying an arm. The two arms rotate a crank spindle by which valve covers, controlling the flow of gas through ports into and out of the measuring chambers, are worked.

Our main object is to provide improvements in the arrangement and disposition of the valves which will enable the meter to work at a greater speed than is at present possible. In consequence the size and weight of the meter can be materially reduced by means of the present invention.

A further object is to provide a total port area which is not less than 0.25 of the cross-sectional area of the meter in the vicinity of the ports.

A further object is to arranged that the major dimension of each port, when of elongated shape, is more than half as great as the dimension of the partition on a cross-section in the vicinity of the ports.

When the ports are arranged so that their major dimensions are substantially parallel to the partition, the valve covers should be operable to-and-fro in a direction substantially at right-angles to the partition, and they preferably extend (substantially parallel to the partition) from near one side of the meter to near the spindles (oscillated by the diaphragms on opposite sides of the partition) at the opposite side of the meter, and the equivalent dimensions of the ports are as great as possible.

In the accompanying sheet of drawings—

Figure 1:
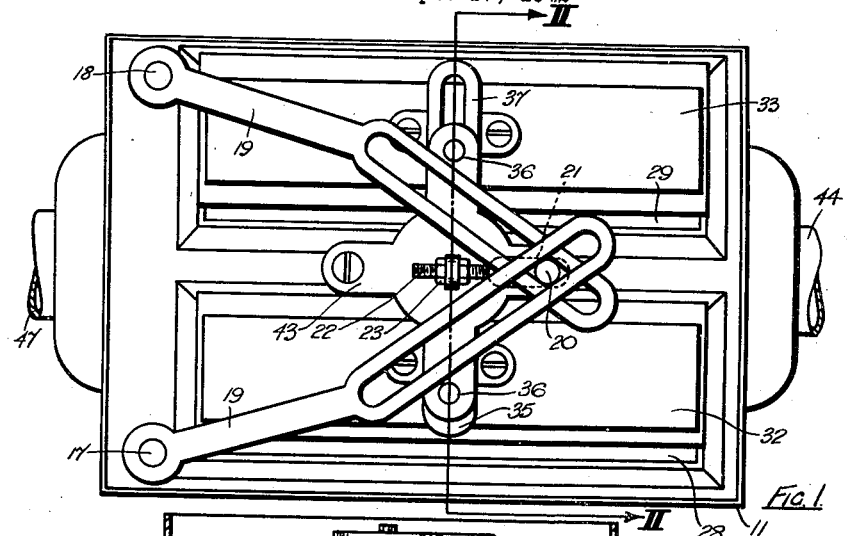
Figure 1 is a plan view of a gas meter, with the top of the meter casing removed, having valves arranged according to the invention.

The main portion of the meter casing 11 is divided by a central vertical partition 12 into two main chambers each of which is sub-divided by a diaphragm into two measuring chambers, 13a, 13b and 14a, 14b. The diaphragms are marked 15, 16. As the diaphragms reciprocate (due to the gas flow) they oscillate vertical spindles 17, 18 carrying arms 19, 19 which engage a pin 20 on the so-called tangent arm 21, and in this way the latter can be continuously rotated, in the well known manner, as long as gas is being delivered by the meter. The tangent arm has a screw-threaded stem 22 adjustably secured, by means of nuts 23, to the upper end of the crank spindle 24.

On each side of the partition 12 is a valve plate 25 provided with a series of three ports. Those on one side of the partition are marked 26, 27 and 28, and those on the other 29, 30 and 31. (The major dimension—i. e., the length—of the port 29 can be observed in Figure 1, being greater than half the length of the partition 12 in the same direction.) Co-acting with the sets of ports are valve covers 32 and 33. The valve covers are fast, respectively, with arms 34, 35, and are guided for reciprocation in a direction at right-angles to the partition 12 by means of pins 36, 36 engaged in elongated slots 37 in the arms, the latter having a third elongated slot 38 which receives the crank spindle 24. Each of the arms 34, 35 has a transverse slot 39 engaged with a crank-pin on a disc 40 fast with the crank spindle, the crank-pins being marked 41 and 42. The guiding pins 36 are carried by a bracket 43 which is supported from the valve plate between the two valve covers. The latter are preferably of a light material, such as a magnesium or aluminium alloy, or a non-metallic mouldable material.

Figure 2:
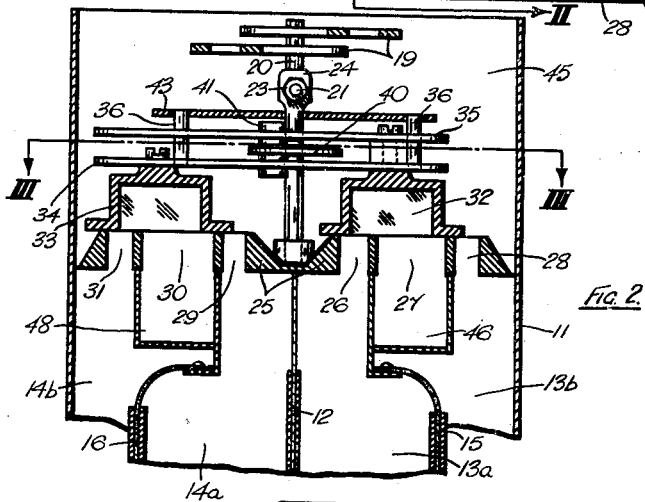
Figure 2 is a sectional elevation thereof taken mainly on the line II—II of Figure 1.
Figure 3:
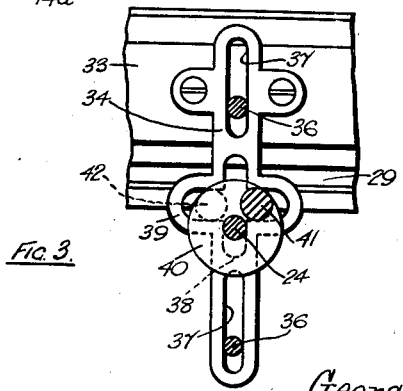
Figure 3 is a fragmentary plan view of one of the valve covers and the actuating mechanism thereof, taken mainly on the line III—III of Figure 2.

The operation of this meter is as follows:

Gas enters the inlet 44 to the upper chamber 45 of the meter and, with the valve covers in the positions shown, it can pass through the port 28 into the measuring chamber 13b, thus driving the diaphragm 15 to the left to deliver gas from the measuring chamber 13a through the port 26 and the port 27 to the duct 46 connected to the outlet 47. The tangent arm 21 is driven in an anticlockwise direction (Figure 1), and it will be observed from a consideration of Figure 3 that the valve cover 32 (crank-pin 41) will remain substantially stationary in the position shown in Figure 2 for approximately 90° of the crank spindle rotation, during which the diaphragm 15 will have travelled materially across the chamber on the right-hand side (Figure 2) of the partition 12. Thereupon the crank-pin 41, having reached the position which is occupied in Figure 3 by the crank-pin 42, will begin actively moving the valve cover 32 to its other extreme position, in which the port 28 will be placed in communication with the port 27 to exhaust the right-hand side of the diaphragm 15, whilst gas from the inlet 44 will flow through the port 26 to the left-hand side of the diaphragm to move it to the right. In a similar way, as regards the measuring chambers 14a, 14b, with the valve cover 33 in the position shown in Figure 2, gas from the inlet 44 enters the port 29 to the measuring chamber 14a. The valve cover 33 has remained substantially in the position shown during the previous 90° rotation of the crank spindle, during which gas from the measuring chamber 14b has been exhausted through the ports 31 and 30 to the duct 48 leading to the outlet 47, and the valve cover is about to be moved to its other extreme position to supply gas from the inlet 44 through the port 31 against the left-hand side of the diaphragm 16 to move it to the right and exhaust the measuring chamber 14a through the ports 29 and 30.

It will be observed that we provide a very large port area, as large in fact as possible for mechanical reasons, the valve covers extending from near the inlet side of the meter casing to near the spindles 17, 18 on the other side of the meter casing. (The port area, in fact, amounts to about 0.53 of the area of the valve plate—i. e., over 50% of the valve plate is "ports.") This naturally assists in speeding up the operation of the meter. Furthermore, due to the large size of the ports, the reciprocatory movement of the valve covers is materially reduced (compared with an ordinary gas meter), which naturally absorbs much less power.

In an ordinary gas meter the port area is only about 0.1 of the area of the valve plate—i. e., of the cross-sectional area of the meter in the vicinity of the ports. In an exceptional case it is as high as 0.18.

In point of fact, we contemplate, by means of the present invention, being able, for a given delivery of gas, to reduce the size or weight of a meter to almost one-sixth of the normal size or weight. In other words, in favourable conditions, we believe that our meter should be capable of passing about six times as much gas as an ordinary meter of the same size and weight.

What we claim as our invention and desire to secure by Letters Patent of the United States is:

1. A gas meter, of the kind specified, having elongated valve ports, measuring chambers communicating with the valve ports, and a partition separating said chambers, the major dimension of each of the ports being more than half as great as the dimension of the partition on a cross-section in the vicinity of the ports.

2. A gas meter, of the kind specified, comprising measuring chambers, a partition separating said chambers, a valve plate on each side of the partition with elongated ports the major dimensions of which are substantially parallel to the said partition and which communicate with the measuring chambers on the associated side of the partition, a valve cover co-acting with each of said valve plates, and means for operating said valve covers in a direction substantially at right-angles to the partition, the major dimension of each of the ports being more than half as great as the dimension of the partition in the same direction.

3. A gas meter, according to claim 2, in which said valve cover operating means includes spindles and diaphragms for oscillating said spindles, said valve covers extending substantially parallel to the partition from near one side of the meter at the adjacent edge of the partition to near the spindles at the opposite side of the meter.

4. A gas meter, according to claim 2, in which said valve cover operating means includes a crank-pin operatively connected to each valve cover, an arm secured to each valve cover and having a slot substantially parallel to the partition and engaged by said crank-pin, each said arm also having guiding slots extending in the direction of movement of the valve cover, and stationary pins engaging said guiding slots.

GEORGE A. ORMEROD.
ALFRED SMITH.